US010642383B2

(12) United States Patent
Kugler et al.

(10) Patent No.: US 10,642,383 B2
(45) Date of Patent: May 5, 2020

(54) APPARATUS FOR SENSING USER INPUT

(71) Applicant: Google LLC, Mountain View, CA (US)

(72) Inventors: Tyler Reed Kugler, San Francisco, CA (US); Alexey Polyudov, Morgan Hill, CA (US); Kishore Sundara-Rajan, Redwood City, CA (US); Debanjan Mukherjee, San Jose, CA (US); James B. Miller, Sunnyvale, CA (US); James Aaron Cooper, Sunnyvale, CA (US); Kelvin Kwong, San Jose, CA (US); Philip Quinn, San Jose, CA (US)

(73) Assignee: Google LLC, Mountain View, CA (US)

( * ) Notice: Subject to any disclaimer, the term of this patent is extended or adjusted under 35 U.S.C. 154(b) by 112 days.

(21) Appl. No.: 15/991,446

(22) Filed: May 29, 2018

(65) Prior Publication Data

US 2018/0284906 A1 Oct. 4, 2018

Related U.S. Application Data

(63) Continuation of application No. 15/478,773, filed on Apr. 4, 2017, now Pat. No. 10,013,081.

(51) Int. Cl.
  *G06F 3/038* (2013.01)
  *G06F 3/0354* (2013.01)
  (Continued)

(52) U.S. Cl.
  CPC ............ *G06F 3/038* (2013.01); *G06F 1/1626* (2013.01); *G06F 1/1662* (2013.01);
  (Continued)

(58) Field of Classification Search
  CPC ...... G06F 3/038; G06F 1/1626; G06F 3/0202; G06F 1/1662; G06F 3/03547;
  (Continued)

(56) References Cited

U.S. PATENT DOCUMENTS

| 5,648,757 A | 7/1997 | Vernace et al. |
| 5,922,967 A | 7/1999 | Motoyama |

(Continued)

FOREIGN PATENT DOCUMENTS

| EP | 2175344 | 4/2010 |
| EP | 2175625 | 4/2010 |

(Continued)

OTHER PUBLICATIONS

International Search Report and Written Opinion issued in International Application No. PCT/US2017/047065, dated Nov. 10, 2017, 13 pages.

(Continued)

*Primary Examiner* — Carolyn R Edwards

(74) *Attorney, Agent, or Firm* — Fish & Richardson P.C.

(57) ABSTRACT

An apparatus utilizes multiple strain gauge ("SG") sensing units which are each disposed adjacent an inner surface of the device housing. Electrical voltage generated by the SGs is amplified by one or more amplifiers to maximize the resolution between a voltage output of an SG when in a non-pressed state and a voltage output of the SG when in a pressed state. Additionally, an electronic circuit is configured to identify a baseline voltage output for an SG over a period of time for comparing to a voltage output for the SG when the SG is in a pressed state such that the pressed state of the SG can be identified by the electronic circuit by comparing a current output voltage of the SG to the identified baseline voltage.

27 Claims, 5 Drawing Sheets

(51) Int. Cl.
*G06F 1/16* (2006.01)
*H04M 1/23* (2006.01)
*G06F 3/02* (2006.01)

(52) U.S. Cl.
CPC ........ *G06F 3/0202* (2013.01); *G06F 3/03547* (2013.01); *H04M 1/236* (2013.01)

(58) Field of Classification Search
CPC ... G06F 3/011; H04M 1/236; H04M 1/72522; H04M 1/026; G01R 19/165
See application file for complete search history.

(56) References Cited

U.S. PATENT DOCUMENTS

| | | | |
|---|---|---|---|
| 6,392,584 B1 | 5/2002 | Eklund | |
| 6,414,619 B1 | 7/2002 | Swanson | |
| 6,526,801 B2 | 3/2003 | Kotizilestsor | |
| 6,747,573 B1 | 6/2004 | Gerlach | |
| 6,823,200 B2 | 11/2004 | Rekimoto | |
| 7,546,772 B2 | 6/2009 | Cabuz et al. | |
| 7,974,500 B2 | 6/2011 | Silverbrook et al. | |
| 8,078,884 B2 | 12/2011 | Ramatishrian | |
| 8,417,303 B2 | 4/2013 | Ladouceur | |
| 8,442,602 B2 | 5/2013 | Wong | |
| 8,536,765 B2 | 9/2013 | Oh et al. | |
| 8,539,765 B2 | 9/2013 | Oh et al. | |
| 8,559,086 B2 | 10/2013 | Davis et al. | |
| 9,304,948 B2 | 4/2016 | Whitman et al. | |
| 9,411,451 B2 | 8/2016 | Myers et al. | |
| 9,460,029 B2 | 10/2016 | Shaw et al. | |
| 9,465,412 B2 | 10/2016 | Belesin et al. | |
| 2003/0026971 A1 | 2/2003 | Inkster et al. | |
| 2003/0210235 A1 | 11/2003 | Roberts | |
| 2004/0125079 A1 | 7/2004 | Kaneko et al. | |
| 2004/0203500 A1 | 10/2004 | Wong et al. | |
| 2004/0203503 A1 | 10/2004 | Rollins et al. | |
| 2005/0243062 A1* | 11/2005 | Liberty .................. G06F 3/017 |
| | | | 345/158 |
| 2006/0028459 A1 | 2/2006 | Underwood et al. | |
| 2006/0041926 A1 | 2/2006 | Istvan | |
| 2006/0284857 A1* | 12/2006 | Oh ........................ G06F 1/3203 |
| | | | 345/173 |
| 2006/0293864 A1 | 12/2006 | Soss | |
| 2008/0053713 A1 | 3/2008 | Huang et al. | |
| 2008/0122796 A1 | 5/2008 | Jobs | |
| 2008/0166966 A1 | 7/2008 | Hamasak | |
| 2009/0259969 A1 | 10/2009 | Pallakoff | |
| 2009/0312051 A1 | 12/2009 | Hansson | |
| 2009/0315745 A1* | 12/2009 | McLoughlin ......... H03M 1/183 |
| | | | 341/118 |
| 2010/0007618 A1 | 1/2010 | Park | |
| 2010/0015918 A1 | 1/2010 | Liu | |
| 2010/0085317 A1 | 4/2010 | Park | |
| 2010/0085724 A1 | 4/2010 | Park | |
| 2010/0113111 A1 | 5/2010 | Wong | |
| 2010/0123686 A1 | 5/2010 | Klinghult et al. | |
| 2010/0201635 A1 | 8/2010 | Klinghult et al. | |
| 2010/0287470 A1 | 11/2010 | Homma | |
| 2010/0295773 A1* | 11/2010 | Alameh .............. H03K 17/9631 |
| | | | 345/156 |
| 2011/0069024 A1 | 3/2011 | Kim | |
| 2011/0080349 A1* | 4/2011 | Holbein ................ G06F 1/3203 |
| | | | 345/173 |
| 2011/0080367 A1* | 4/2011 | Marchand ............. G06F 1/3215 |
| | | | 345/174 |
| 2011/0187651 A1 | 8/2011 | Whitlow | |
| 2011/0227726 A1 | 9/2011 | Lee | |
| 2011/0254760 A1* | 10/2011 | Lloyd .................... G01P 15/00 |
| | | | 345/156 |
| 2012/0032979 A1 | 2/2012 | Blow | |
| 2012/0075194 A1 | 3/2012 | Ferren et al. | |
| 2012/0088553 A1 | 4/2012 | Nunes | |
| 2012/0098530 A1 | 4/2012 | Saito et al. | |
| 2012/0260220 A1 | 10/2012 | Griffin | |
| 2013/0002565 A1 | 1/2013 | Tumanov et al. | |
| 2013/0009905 A1 | 1/2013 | Castillo et al. | |
| 2013/0076646 A1* | 3/2013 | Krah .................... G06F 3/0414 |
| | | | 345/173 |
| 2013/0096849 A1 | 4/2013 | Campbell et al. | |
| 2013/0135223 A1 | 5/2013 | Shai | |
| 2013/0154998 A1* | 6/2013 | Yang .................. H03K 17/9625 |
| | | | 345/174 |
| 2013/0160567 A1 | 6/2013 | Ota | |
| 2013/0176265 A1* | 7/2013 | Zurek .................... G06F 1/3262 |
| | | | 345/174 |
| 2013/0211740 A1 | 8/2013 | Ramamurthy et al. | |
| 2013/0234948 A1 | 9/2013 | Jian | |
| 2013/0283378 A1 | 10/2013 | Costigan et al. | |
| 2013/0300668 A1 | 11/2013 | Churikov et al. | |
| 2014/0000386 A1 | 1/2014 | Malhan et al. | |
| 2014/0002376 A1* | 1/2014 | Oliver ..................... G06F 3/016 |
| | | | 345/173 |
| 2014/0008999 A1 | 1/2014 | Prest et al. | |
| 2014/0013254 A1 | 1/2014 | Hosein | |
| 2014/0042873 A1 | 2/2014 | Shen | |
| 2014/0073378 A1 | 3/2014 | Coverstone | |
| 2014/0125612 A1 | 5/2014 | Park et al. | |
| 2014/0160088 A1* | 6/2014 | Mercea ................. G06F 1/3259 |
| | | | 345/179 |
| 2014/0200054 A1 | 7/2014 | Fraden | |
| 2014/0217853 A1 | 8/2014 | Mankowski | |
| 2014/0218372 A1 | 8/2014 | Missig | |
| 2014/0289655 A1 | 9/2014 | Park et al. | |
| 2014/0368436 A1 | 12/2014 | Abzarian et al. | |
| 2014/0375582 A1 | 12/2014 | Park et al. | |
| 2015/0069126 A1 | 3/2015 | Leon | |
| 2015/0119114 A1 | 4/2015 | Smith | |
| 2015/0207436 A1 | 7/2015 | Lee | |
| 2015/0257158 A1 | 9/2015 | Jadhav | |
| 2015/0268726 A1* | 9/2015 | Saboune ................. G06F 3/017 |
| | | | 345/156 |
| 2015/0296622 A1 | 10/2015 | Jiang et al. | |
| 2015/0317076 A1 | 11/2015 | Goel et al. | |
| 2015/0331522 A1 | 11/2015 | McMillen | |
| 2016/0084674 A1 | 3/2016 | Cambou et al. | |
| 2016/0187961 A1* | 6/2016 | Elibol ................... G06F 1/3293 |
| | | | 713/323 |
| 2016/0191103 A1 | 6/2016 | Balaji | |
| 2016/0216164 A1 | 7/2016 | Teil | |
| 2016/0259465 A1* | 9/2016 | Agarwal ............... G06F 3/0414 |
| 2017/0031495 A1 | 2/2017 | Smith | |
| 2017/0038905 A1 | 2/2017 | Bijamov et al. | |
| 2017/0336899 A1 | 11/2017 | Szeto | |
| 2019/0179469 A1* | 6/2019 | Quinn ................... G06F 3/0414 |

FOREIGN PATENT DOCUMENTS

| | | |
|---|---|---|
| EP | 7672368 | 12/2013 |
| EP | 2784521 | 1/2014 |
| EP | 2784630 | 10/2014 |
| EP | 2801889 | 11/2014 |
| GB | 1391830 | 4/1975 |
| GB | 2522755 | 12/2014 |
| TW | M533228 U | 12/2016 |
| TW | M538191 U | 3/2017 |
| TW | 201723769 | 7/2017 |
| WO | WO 2006/035342 | 4/2006 |
| WO | WO 2010/058301 | 5/2010 |
| WO | WO 2015/047616 | 4/2015 |
| WO | WO 2015/130040 | 9/2015 |
| WO | WO 2015/179262 | 11/2015 |
| WO | WO 2016/027113 | 2/2016 |
| WO | WO 2016/154762 | 10/2016 |
| WO | WO 2017/011810 | 1/2017 |

OTHER PUBLICATIONS

International Search Report and Written Opinion issued in International Application No. PCT/US2017/057904, dated Jan. 19, 2018, 16 pages.

(56) References Cited

OTHER PUBLICATIONS

Invitation to Pay Additional Fees and, Where Applicable, Protest Fees issued in International Application No. PCT/US2017/065304, dated Feb. 27, 2018, 26 pages.
Invitation to Pay Additional Fees and, Where Applicable, Protest Fees issued in International Application No. PCT/US2017/064916, dated Mar. 5, 2018, 15 pages.
International Search Report and Written Opinion issued in International Application No. PCT/US2017/065307, dated Mar. 7, 2018, 14 pages.
International Search Report and Written Opinion issued in International Application No. PCT/US2017/064916, dated Apr. 30, 2018, 21 pages.
Written Opinion issued in International Application No. PCT/US2017/064916, dated Oct. 22, 2018, 8 pages.
International Preliminary Report on Patentability issued in International Application No. PCT/US2017/057904, dated Feb. 14, 2019, 19 pages.
CN Office Action in Chinese Appln. No. 201810117122.7, dated Dec. 3, 2019, 16 pages (with English translation).
GB Office Action in Great Britain Appln. No. 1714813.1, dated Oct. 18, 2019, 2 pages.
PCT International Preliminary Report on Patentability in International Appln. No. PCT/US2017/047065, dated May 14, 2019, 8 pages.
PCT International Preliminary Report on Patentability in International Appln. No. PCT/US2017/064916, dated Oct. 8, 2019, 13 pages.
PCT International Preliminary Report on Patentability in International Appln. No. PCT/US2017/065304, dated Oct. 22, 2019, 17 pages.
PCT International Preliminary Report on Patentability in International Appln. No. PCT/US2017/065307, dated Oct. 22, 2019, 8 pages.

\* cited by examiner

APPARATUS FOR SENSING USER INPUT

CROSS-REFERENCE TO RELATED APPLICATIONS

This application is a continuation of and claims priority to U.S. application Ser. No. 15/478,773, filed on Apr. 4, 2017, the entire contents of which are hereby incorporated by reference.

BACKGROUND

Electronic devices sometimes include buttons that protrude from an outer or exterior surface of a housing of the electronic device. In general, the buttons serve as physical inputs to allow users to cause changes to device functions (such as volume control, display activation/deactivation, switching to/from vibrate mode, etc.). Such buttons are typically positioned on the sides of electronic devices such as smartphones, other mobile cellular devices, tablet computers, notebook computers, and desktop computers.

SUMMARY

An apparatus for sensing user input to an electronic device is described. The apparatus utilizes multiple strain gauge ("SG") sensing units which are each disposed adjacent an inner surface of the device housing. The SG sensing units are configured to detect a particular type of user input to the device based on at least one of: the magnitude of strain applied to the SG sensing units, the relative location of the applied strain, and the duration of the applied strain. The SG sensing units can be arranged in particular configurations to sense applied strain along, for example, a lengthwise dimension of the device and/or a widthwise dimension of the device. Electrical voltage generated by the SGs is amplified by one or more amplifiers to maximize the resolution between a voltage output of an SG when in a non-pressed state and a voltage output of the SG when in a pressed state. Additionally, an electronic circuit is configured to identify a baseline voltage output for an SG over a period of time for comparing to a voltage output for the SG when the SG is in a pressed state such that the pressed state of the SG can be identified by the electronic circuit by comparing a current output voltage of the SG to the identified baseline voltage. Hence, the described sensing apparatus provides methods and techniques for receiving user input to an electronic device while also replacing physical buttons that protrude above an exterior surface of the device.

In one innovative aspect of the specification, an apparatus for sensing user input provided on an exterior surface of an electronic device is described. The apparatus is configured for inclusion in an electronic device (such as a smart phone, tablet device, or personal computer) and can be configured to sense user input provided on an exterior surface of an electronic device. In general, in one aspect, the apparatus can include a first strain gauge configured to couple with a housing of an electronic device; an amplifier electrically coupled to the first strain gauge and configured to amplify an electrical property of the first strain gauge; an analog-to-digital converter electrically coupled to the amplifier; and an electronic circuit electrically coupled to the first strain gauge. The electronic circuit can be configured to (i) receive a first parameter signal from the analog-to-digital converter in response to user input that interacts with the housing over a location of the first strain gauge, (ii) determine a value for the first parameter signal, (iii) compare the determined value of the first parameter signal to a maximum value associated with the analog-to-digital converter, and (iv) adjust an amplification level of the amplifier in response to comparing the determined value of the first parameter signal to the maximum value associated with the analog-to-digital converter.

These and other embodiments can each optionally include one or more of the following features. Adjusting the amplification level of the amplifier in response to comparing the determined value of the first parameter signal to the maximum value associated with the analog-to-digital converter can include adjusting the amplification level to a highest available amplification multiplier that does not cause an output of the amplifier to exceed a maximum input value for the analog-to-digital converter over a period of time. Adjusting the amplification level of the amplifier in response to comparing the determined value of the first parameter signal to the maximum value associated with the analog-to-digital converter can include determining, by the electronic circuit, that the first strain gauge has experienced physical damage; and in response to determining that the first strain gauge has experienced physical damage, reducing the amplification level of the amplifier to adjust for an increased voltage output of the first strain gauge due to the damage to the first strain gauge. Determining that the first strain gauge has experienced physical damage can include identifying that a baseline output value of the analog-to-digital converter has increased above a threshold amount for a specified period of time.

Adjusting the amplification level of the amplifier in response to comparing the determined value of the first parameter signal to the maximum value associated with the analog-to-digital converter can include reducing the amplification level of the amplifier such that an output voltage of the amplifier does not exceed a maximum input voltage for the analog-to-digital converter when pressure is applied to the first strain gauge by a user. The electronic circuit can be configured to adjust the amplification level of the amplifier in response to determining that an output voltage of the amplifier has exceeded a maximum input voltage associated with the analog-to-digital converter. The electronic circuit can be configured to adjust the amplification level of the amplifier in response to determining that an output voltage of the amplifier is outside of an acceptable input voltage range associated with the analog-to-digital converter. The electronic circuit can be further configured to (v) determine a baseline output value for the analog-to-digital converter over a period of time; (vi) compare the determined value for the first parameter signal to the baseline output value; and (vii) indicate that a first type of user input has been received in response to comparing the determined value for the first parameter signal to the baseline output value. The electronic circuit can be further configured to (v) sample outputs of the analog-to-digital converter at a first sampling rate; (vi) receive one or more signals indicating that the electronic device is in an inactive mode; and (vii) reduce the sampling rate for sampling outputs of the analog-to-digital converter to a second sampling rate in response to receiving the one or more signals indicating that the electronic device is in an inactive mode. The electronic circuit can be further configured to (v) sample outputs of the analog-to-digital converter at a first sampling rate; (vi) receive one or more signals indicating that the electronic device has entered an active mode; and (vii) increase the sampling rate for sampling outputs of the analog-to-digital converter to a second sampling rate in response to receiving the one or more signals indicating that the electronic device has entered the active mode.

The subject matter described in this specification can be implemented in particular embodiments and can result in one or more of the following advantages. The apparatus of this specification allows device manufacturers to produce electronic devices that have a reduced quantity of buttons protruding from an exterior surface of the device housing. More particularly, reducing the number of buttons can minimize steps required during execution of manufacturing and/or machining operations when producing device housings in substantial volumes. Furthermore, use of the SG sensing units described in this specification can reduce the amount of circuit components (wires, capacitors, etc.) as well as power consumption typically required to enable sensing functions provided by mechanical buttons. Additionally, electrical components can amplify or modify electrical signals received from components of a strain gage to increase detectability between a sensed voltage when a strain gage is being pressed as compared to a baseline sensed voltage. Furthermore, amplification of electrical signals received from components of an SG sensing unit can be adjusted to account for damage to a strain gage or degradation over time of a strain gage. The apparatus of this specification further allows for a baseline sensed voltage to be identified for comparison to sensed voltages indicative of a user applying pressure to a strain gauge. Furthermore, various power management techniques for reducing power consumption (such as, for example, adjustment of sampling rates in response to detected parameters) are described.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
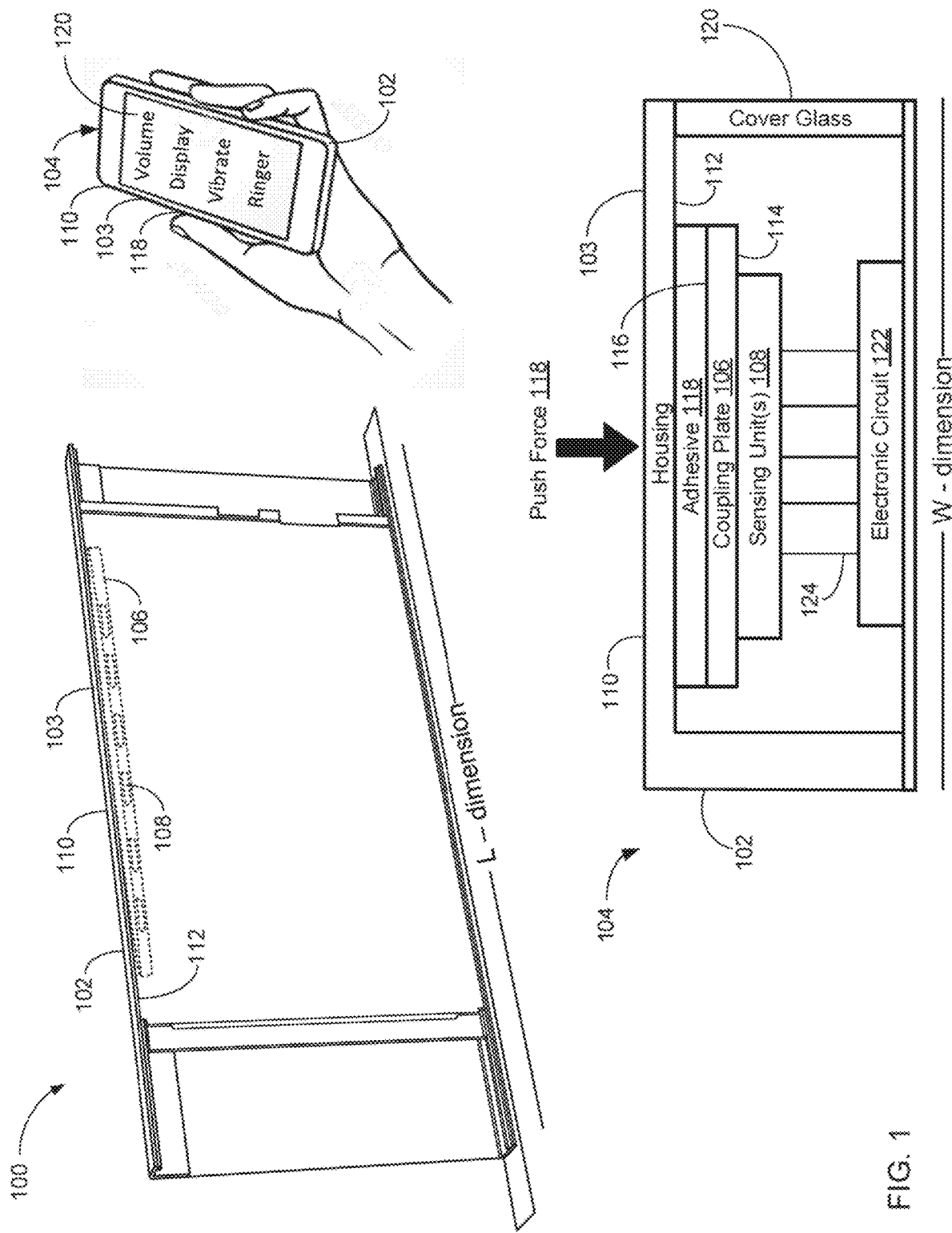
FIG. 1 illustrates diagrams associated with an apparatus for sensing user input to an example electronic device.

An apparatus for sensing user input to an electronic device is described. The apparatus utilizes multiple strain gauge ("SG") sensing units which are each disposed adjacent an inner surface of a housing of the electronic device. The apparatus includes an electronic circuit that electrically couples to each SG sensing unit. The electronic circuit is generally configured to receive parameter signals in response to user input that interacts with the housing.

User input to the device can include strain applied to an area of the outer surface of the housing. The area can be either adjacent to, or substantially adjacent to, a particular SG sensing unit that is affixed to an inner surface of the housing on the other side of a housing wall that defines the inner and outer surfaces. In response to strain applied to the SG sensing unit, the SG sensing unit senses a particular type of user input to the device based on at least one of: a magnitude of the applied strain, the relative location and of the applied strain, or a duration of the applied strain.

In general, each SG sensing unit includes multiple individual strain gauges that each have a particular resistance attribute. The SGs can be arranged in a particular configuration to form a single SG sensing unit and each SG sensing unit can receive a voltage signal of a predefined voltage value. One or more output voltage signals received from each SG sensing unit are then measured by the electronic circuit and then converted into an example parameter signal. The output voltage signals are measured to detect any shifts or changes to the corresponding voltage value of the applied signal.

Applied strain to the outer surface of the housing can cause slight physical changes (e.g., expansion or contraction) to at least one SG of a SG sensing unit. The physical changes can cause a change in a resistance attribute of a SG. The change in the resistance attribute causes a corresponding change in the measured output voltage value and, thus, indicates a differential voltage signal that is received and measured by the electronic circuit. A range of differential output voltage signal values can be mapped to individual user input types. The mapped values can be used by the electronic device to detect or determine particular user input types based on a characteristic of the applied strain and the corresponding signal value caused by the applied strain.

The electronic circuit can identify a baseline output voltage for the SG such that measured output voltage values can be compared to the baseline output voltage to determine if a change in the measured output voltage has occurred. For example, the electronic circuit can identify a running average for output voltage over a period of time (e.g., ten minutes) to establish a baseline output voltage value. In some cases, sudden or brief spikes in output voltage are ignored by the electronic circuit when identifying the baseline output voltage. The electronic circuit can continually compare current output voltage samples to the baseline to determine if a change in the measured output voltage indicative of a user applying pressure to a SG has occurred.

Each SG sensing unit can additionally include an amplifier for amplifying the analog output voltage of the SG prior to the output voltage reaching an analog-to-digital converter (ADC). The amplifier can apply a multiplier to the analog output voltage to increase detectability of changes to the output voltage due to pressure applied to the SG by a user. The electronic circuit can adjust the amount of amplification applied by the amplifier to prevent the output voltage from "railing" or exceeding a voltage range of detectable output voltages. For example, the electronic circuit can control the amplifier to amplify the output voltage such that a maximum value of the amplified output voltage that does not exceed +/−3 volts.

The electronic circuit can also implement power management processes to reduce power consumption of the SG sensing units. For example, the electronic circuits can reduce the sampling rate for detecting changes in the output voltage of SGs in response to detected parameters. For example, the sampling rate can be reduced when a mobile device is plugged in and in a relatively horizontal position, as another example, the sampling rate can be reduced when the mobile device is attached to a docking station. As another example, the sampling rate can be reduced when a proximity detector of the mobile device determines that the mobile device is near something, such as in a user's pocket.

FIG. 1 depicts diagrams associated with an apparatus 100 for sensing user input to an example electronic device. Apparatus 100 generally includes a housing 102 that can later receive multiple electronic components to form user device 104. In general, user device 104 can include smartphones, mobile devices, cellular devices, smart televisions, laptop computers, tablet computers, notebook computers, desktop computers, electronic readers, home automation devices, or a variety other types of computing devices or consumer electronic devices.

Apparatus 100 further includes coupling plate 106 and multiple SG sensing units 108 (hereinafter "sensing unit 108"). As discussed in more detail below, each sensing unit 108 can include multiple strain gauges that can form sets of strain gauges that are arranged in a particular configuration within the unit. As generally shown, housing 102 can include a housing wall having an outer surface 110 corresponding to a first side of the wall and an inner surface 112 corresponding to a second side of the wall that is opposite the first side. Similarly, plate 106 can have a first side 114 and a second side 116 that is opposite the first side 114.

In some implementations, plate 106 can include multiple sensing units 108 affixed to first side 114. As shown, plate 106 can be affixed or bonded to inner surface 112 by adhesive 118 that can be disposed generally intermediate second side 116 and housing wall 103. Plate 106 can be formed from a variety of different materials such as steel, fiberglass, hardened plastic or other materials having properties that enable plate 106 to be affixed to wall 103. Adhesive 118 can be any adhesive material or compound such as glue, epoxy resin, bonding agent, or other materials suitable to securely affix/attach plate 106 to inner surface 112 of housing wall 103. Additionally, although identified as an adhesive, a variety of mechanical based fastening means suitable to securely affix/attach or couple plate 106 to inner surface 112 can also be utilized.

Housing 102 can receive multiple electronic components to form user device 104, which includes cover glass 120. Hence, apparatus 100 can include an example electronic circuit 122 that is disposed internally within device 104. Wire(s)/conductor(s) 124 can electrically couple, to circuit 122, one or more strain gauge sets within sensing unit 108. In some implementations, the electronic circuit 122 includes an amplifier for amplifying the voltage of electronic signals received from the one or more strain gauges. The electronic circuit 122 can additionally include an analog-to-digital converter (ADC) for converting voltages received from the one or more strain gauges to digitally quantized values. In some implementations, the amplifier and/or ADC can be implemented separately from the electronic circuit 122 and can be positioned along the electrical communication path of the wires/conductors 124 between the electronic circuit and the one or more strain gauges. In some implementations, the user device 104 includes a separate amplifier and ADC for each strain gauge to individually amplify and digitally quantize individual voltage signals from each strain gauge.

As discussed in more detail below, an example user can provide a particular type of user input to device 104 by applying a push force 118 that can vary in push force magnitude and push force duration and/or frequency. Push force 118 provides a corresponding strain force that is applied to a particular SG set in respective sensing units 108 affixed to inner surface 112 of housing wall 103. In general, sensing units 108 can be arranged in particular configurations to sense/detect applied strain along, for example, a lengthwise (L) dimension of device 104 and/or a widthwise (W) dimension of device 104.

The applied strain can be detected by a parameter signal received by one or more components of circuit 122. A value of the detected parameter signal can correspond to a particular type of user input. In some implementations, the type of user input can be viewable via a display device through cover glass 120. Different input types can include, for example, user input to adjust an audio volume output of user device 104, user input to activate or deactivate a display device of user device 104, user input to activate or deactivate a vibrate mode of user device 104, and/or user input to adjust the volume of a ring tone of user device 104. In alternative implementations, a variety of different user input types can be detected based, at least in part, on a particular value of the detected parameter signal.

As an example, apparatus 100 can be used in the following implementation. A user, Frank, wants to change the volume on a computing device, e.g., Frank's smartphone. Apparatus 100 can be implemented within Frank's smartphone such that sensing units 108 are disposed along, for example, a lengthwise edge of Frank's smartphone. When Frank presses a part of the smartphone housing associated with a volume setting a particular strain gauge within sensing unit 108 is strained.

In response to the press applied by Frank, a change in a differential voltage value is detected by an electronic circuit disposed within Frank's smartphone. The smartphone can be configured to detect the differential voltage value and associate particular values with, for example, a volume press because the detected voltage change exceeds a threshold voltage change. A duration of the voltage change is measured, and the electronic circuit (which can be part of a microprocessor) outputs a value which indicates to the microprocessor that it is to change the volume of an audio signal that is being output by a speaker of Frank's smartphone.

In some implementations, the electronic circuit 122 includes an ADC that converts the differential voltage value to a digital quantized value. For example, differential voltages ranging from −3V to 3V output by the sensing unit 108 can be converted to ADC units or "counts" ranging from 0 to 10,000. This range of ADC counts can be divided into a number of discrete ranges (e.g., five ranges of 2000 counts each or six ranges of 1666 counts each). When the example user presses a part of the smartphone housing associated with the volume setting strain gauge, an output voltage of the corresponding sensing unit 108 is converted to a quantized count number by the ADC. The output value of the ADC can be categorized into one of the discrete count ranges to identify a particular input indicated by the user. For example, a volume of the smartphone can be increased at varying rates based on the identified count range for a particular output value of the ADC.

Figure 2:
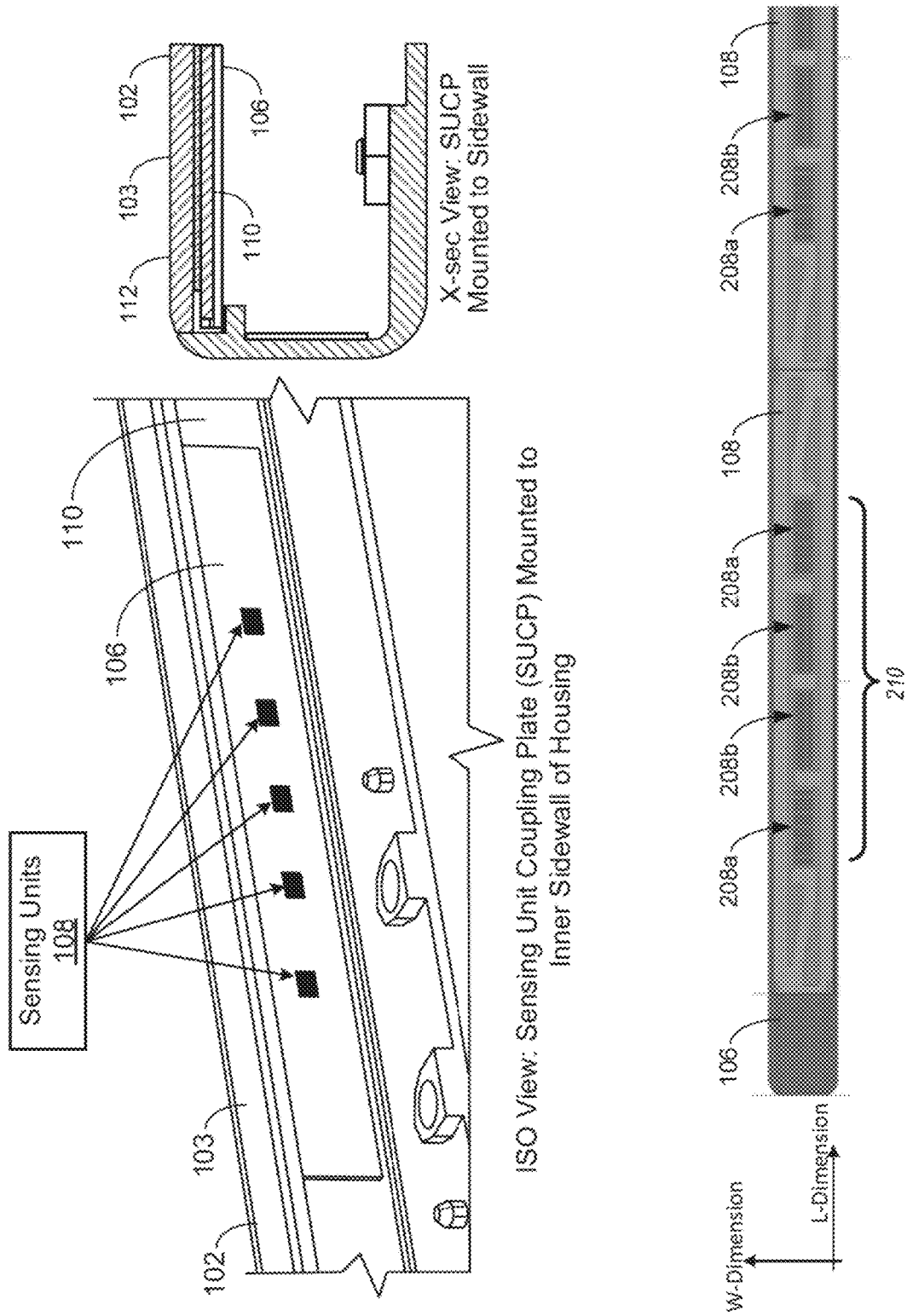
FIG. 2 illustrates diagrams that include multiple strain gauges that can be used in the apparatus of FIG. 1.

FIG. 2 illustrates diagrams that include multiple strain gauge units that can be used in sensing units 108 of apparatus 100. As shown, the implementation of FIG. 2 includes multiple technical features described above with reference to FIG. 1. In particular, FIG. 2 illustrates, in part: 1) an isolation (ISO) view that generally depicts multiple individual sensing units 108 attached to plate 106 that is affixed to inner surface 110 of housing wall 103; and 2) a cross-section (X-sec) view that depicts plate 106 attached/affixed to inner surface 110 of housing wall 103.

Each sensing unit 108 can include multiple strain gauge units 208 that form sets of strain gauges that are arranged in a particular configuration within sensing unit 108. In some implementations, at least two SGs 208 can form a SG set 208a/b and multiple SG sets 208a/b can form a SG grouping 210. When disposed against, or affixed to, inner surface 110, multiple SG sets 208a/b can be arranged in particular orientations relative to each other. For example, a first SG set 208a can be arranged in a first orientation corresponding to a first dimension so as to detect or measure applied strain along the first dimension. Likewise, a second SG set 208b can be arranged in a second orientation corresponding to a second dimension so as to detect or measure applied strain along the second dimension.

In general, the first orientation and the first dimension can be different from the second orientation and the second dimension. In some implementations, when user device 104 is positioned generally longitudinally upright (e.g., when held by a user), the first orientation can correspond to a vertical orientation and the first dimension can correspond to a lengthwise (L) dimension. Further, when in this longitudinally upright position, the second orientation can correspond to a horizontal orientation and the second dimension can correspond to a widthwise (W) dimension.

In the implementation of FIG. 2, when disposed within user device 104, SG grouping 210 can have a SG set 208a that includes two SGs 208 disposed in a horizontal orientation (when the device is upright) to measure applied strain to surface 112 in the widthwise dimension. Moreover, SG grouping 210 can also have a SG set 208b that includes two SG units 208 disposed in a vertical orientation (when the device is upright) to measure applied strain in the lengthwise dimension. As shown, SGs 208 of SG grouping 210 can each be arranged in a parallel configuration, relative to each other, and can be disposed generally along the lengthwise dimension of a wall 103 (e.g., a sidewall) of housing 102.

When installed within user device 104, each SG grouping 210 of sensing unit 108 can be used to detect or sense user input in the form of applied force to surface 112. The applied force can cause SGs 208 to change in electrical characteristics, to cause the electronic circuit 122 to sense an increased strain. User device 104 can be configured to recognize the increased strain as corresponding to different user input types such as a user pushing, swiping, tapping, squeezing or otherwise touching a particular area on a sidewall wall of user device 104.

For example, when a user pushes on an edge or sidewall of housing 102 that is adjacent a SG 208, the housing and plate 106 can bend or flex, causing SG 208 to change in electrical characteristics (e.g., the resistance of resistors change within a particular strain gauge), which affects the voltage of an electrical signal applied to the SG 208 and which causes the electronic circuit 122 (analyzing the electrical signal) to sense an increased strain along, for example, the lengthwise dimension of device 104. Accordingly, user device 104 senses a push on the edge of housing 102 and can indicate to the user, via an example display device (protected by cover glass 120), the particular input type associated with the user's push/touch. In some implementations, multiple sensing units 108 can be disposed or positioned along an edge or sidewall of housing 102 in order to sense or detect the particular input type and/or the proximate location of the push applied along the length of device 104. The electronic circuit 122 can analyze the electrical signal that is received from each of the SG set 208a and SG set 208b.

As an overview of the terminology used herein, user device 104 may include multiple sensors or sensing units 108. Each sensing unit 108 may include two strain gauge sets indicated as features 208a and 208b. As an example, strain gauge set 208a can be oriented vertically and strain gauge set 208b can be oriented horizontally. Each strain gauge set 208a or 208b includes two individual strain gauge units 208. More particularly, and stated another way, each sensing unit 108 includes four strain gauge units 208 or resistors 208 (discussed below with reference to FIG. 3) which form the two strain gauge sets 208a/b or circuit branches (discussed below with reference to FIG. 3). Reference feature 210 refers to a strain gauge grouping that includes the four individual strain gauges 208 that collectively form a single sensor 108.

Figure 3:
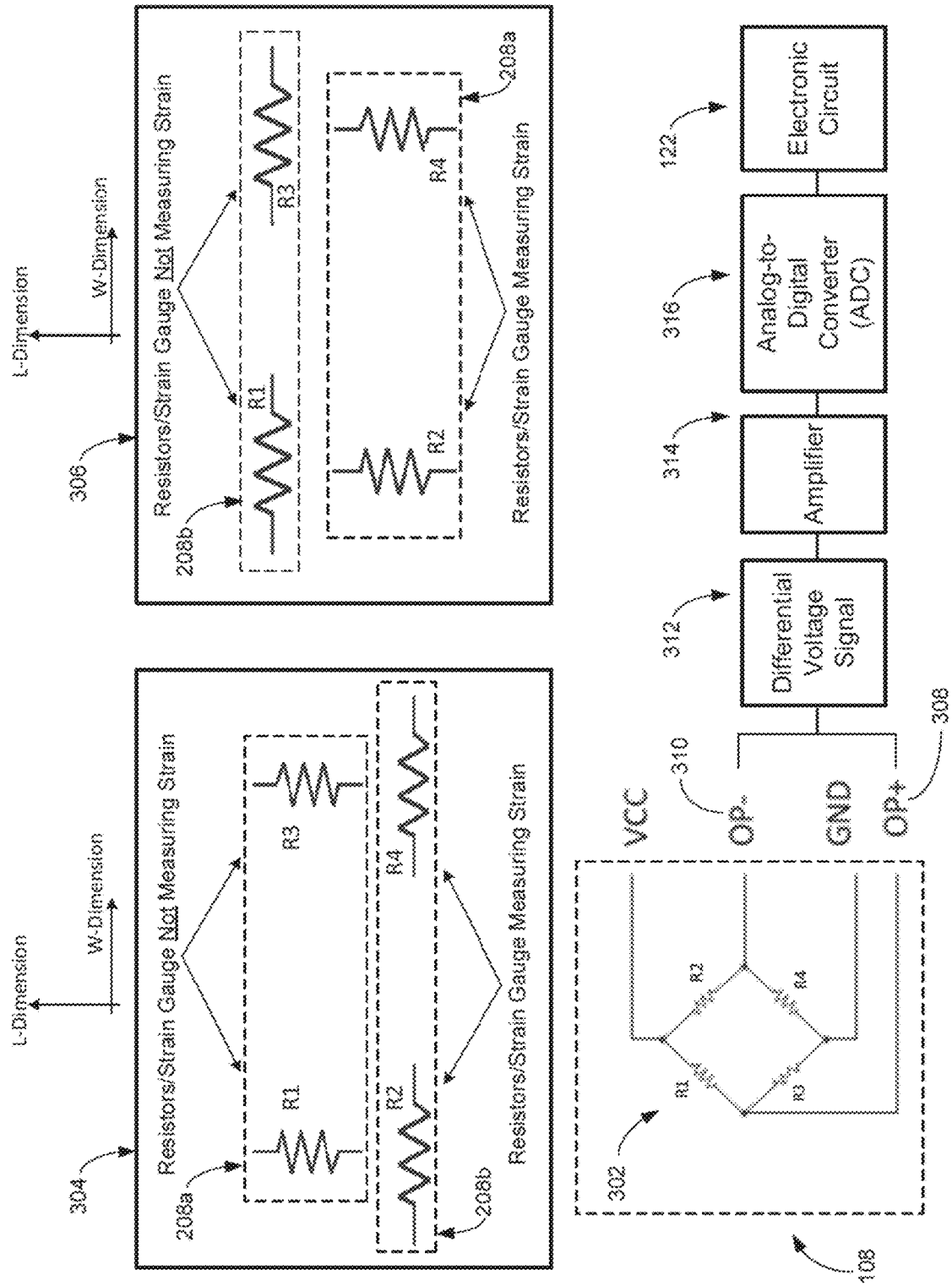
FIG. 3 illustrates diagrams that include resistor configurations, an example bridge circuit, an amplifier, and analog-to-digital converter that can be implemented to sense user input to an electronic device.

FIG. 3 illustrates diagrams that include resistor configurations, an example bridge circuit 302, and various other electronic components that can be used to sense user input to an electronic device. As discussed above, each sensing unit 108 includes multiple individual SGs 208 that each have a particular resistance attribute. Hence, as shown in FIG. 3, in alternative implementations SG 208 can be depicted as one of resistors (R1-R4) that each have an initial resistance value or resistance attribute which can, in some implementations, change in response to applied pressure. In particular, sensing unit 108 can be modeled or depicted as bridge circuit 302 that includes positive (voltage polarity) output 308 and negative (voltage polarity) output 310.

As shown, in some implementations, resistor orientation 304 can include resistors R2 and R4 having a horizontal orientation so as to measure applied strain in the widthwise (W) dimension, while resistors R1 & R3 (vertical orientation) remain relatively fixed when strain is applied due to their orientation and, thus, do not measure applied strain. In contrast, resistor orientation 306 can include resistors R2 and R4 having a vertical orientation so as to measure applied strain in the lengthwise (L) dimension while resistors R1 & R3 (horizontal orientation) remain relatively fixed when strain is applied due to their orientation and, thus, do not measure applied strain.

In general, when a particular set of resistors are disposed perpendicular to a particular strain direction, that particular resistor set will generally not measure strain associated with that particular strain direction. For example, as shown in resistor orientation 304, for a strain force applied in the widthwise (W) dimension/direction, SG set 208a is perpendicular to the strain direction and, thus, will generally not measure applied strain. However, SG set 208b is parallel to the strain direction and will measure applied strain. Further, as shown in resistor orientation 306, for a strain force applied in the lengthwise (L) dimension/direction, SG set 208b is perpendicular to the strain direction and, thus, will generally not measure applied strain. However, SG set 208a is parallel to the strain direction and will measure applied strain.

In general, bridge circuit 302 includes two branches. A first branch is indicated by R1 & R3 and the output node (for output 308) intermediate R1 & R3. A second branch is indicated by R2 & R4 and the output node (for output 310) intermediate R2 & R4. Bridge circuit 302 can receive an applied voltage (VCC). Electronic circuit 122 can receive or detect a differential voltage signal 312 in response to a change in the resistance attribute of any one of resistors R1-R4. In some implementations, circuit 122 provides the VCC voltage signal and can then execute a basic comparator circuit to analyze signal 312 relative to the VCC signal. The analysis can enable circuit 122 to detect or determine the extent to which the measured value of signal 312 indicates a deviation from the initially applied VCC voltage value. In some implementations, the differential voltage signal 312 is passed through an amplifier 314 and analog-to-digital converter (ADC) 316 prior to reaching the electronic circuit 122. In some implementations, the amplifier 314 and/or the ADC 316 are implemented as part of the electronic circuit 122.

The ADC 316 can be, for example, a 24-bit ADC that quantizes input voltages into ADC units or "counts." For example, the ADC can quantize input voltages into a range of values from 1 to 10,000 counts. The ADC 316 can additionally have an allowable input voltage range. For example, the allowable input voltage range for the ADC 316 can be from −3 V to +3 V.

During operation, and when disposed along inner surface 110 within user device 104, sensing unit 108 can detect applied strain in response to a touch force that is applied to a certain location of housing wall 103 (e.g., an edge/sidewall of user device 104). For example, and as noted above, user input in the form of applied strain to the edge of device 104 can cause parameter signals to be received by electronic circuit 122. The parameter signals can be received in response to user input detected by sensing unit 108, e.g., SG grouping 210, and can indicate a user input of a particular type, e.g., volume adjustment, activate vibrate mode, etc. Hence, detection of the user input can cause a corresponding response from device 104, e.g., indication on the display device associated with a volume level increasing or decreasing.

For example, and with reference to bridge circuit 302, sensing unit 108 can include SG set 208a (resistors R1 & R3) that indicates a parameter signal having a first voltage value (via output node 308). Sensing unit 108 can further include SG set 208b (resistors R2 & R4) that indicates a parameter signal having a second voltage value (via output node 310). The first voltage value and the second voltage value can be indicated concurrently in response to the user input of a particular type that causes a particular corresponding response from user device 104.

In some examples, applied strain in the W-dimension can cause physical changes to SG set 208b that in turn causes the resistance attribute of resistors R2 & R4, measured in ohms, to change (either increase or decrease) by a predefined amount based on the magnitude of the applied force. Accordingly, presuming all resistance values in circuit 302 are generally the same, the change in a resistance attribute of R2 & R4 will cause a corresponding change in the voltage value measured at output 310. Thus, a differential voltage signal 312, relative to outputs 308 and 310, will be measured or detected by electronic circuit 122. In some implementations, the differential voltage signal 312 can be, for example, in the microvolt or the millivolt range. Thus, the differential voltage signal 312 can be amplified by the amplifier 314. As previously described, the amplifier 314 can be implemented as a standalone circuit, or as part of the electronic circuit 122.

In some implementations, the difference between the differential voltage signal 312 when the sensing unit 108 is not being pressed and the differential voltage signal 312 when the sensing unit 108 is being pressed can be, for example, 100 mv or smaller. The amplifier 314 can amplify the differential voltage signal 312 to increase the resolution of the difference between the differential voltage signal 312 when the sensing unit 108 is being pressed and the differential voltage signal 312 when the sensing unit 108 is not being pressed. In some implementations, the amplifier 314 is adjustable and the amplification level of the amplifier 314 is controlled by the electronic circuit 122. The electronic circuit 122 can control the amplifier 314 to amplify the differential voltage signal 312 such that the resolution of the difference between the differential voltage signal 312 value in different states is maximized while avoiding "railing" (i.e., exceeding a maximum voltage) of the signal.

For example, the ADC 316 can have an allowable input voltage range such that input voltages outside of that range are not accurately converted to a digitally quantized value. For example, the ADC 316 can have an allowable input range of −3V to +3V. If the output of the amplifier 314 is greater than +3V or less than −3V, the ADC 316 is not able to accurately convert the input signal to a number of ADC units or "counts." The electronic circuit 122 therefore controls the voltage multiplier of the amplifier 314 such that the output of the amplifier 314 does not fall outside of the allowable voltage range for the ADC 316. In some implementations, the allowable voltage range can be defined by a component other than the ADC 316. For example, the electronic circuit 122 can define the allowable voltage range for output voltages of the amplifier 314.

In some implementations, the range of values for the differential voltage signal 312 produced by the bridge circuit 302 can change over time due to factors such as damage to the sensing unit 108, wear and tear, changes in temperature, changes in atmospheric pressure, or degradation of components of the sensing unit 108 over time. The electronic circuit 122 can control the amplification level of the amplifier 314 as the range of values of the differential voltage signal 312 changes such that the output of the amplifier 314 is maximized while still preventing the output of the amplifier 314 from being outside of the acceptable voltage range for the ADC 316.

For example, at an initial point in time (e.g., time of manufacture or time of activation) the differential voltage signal 312 that serves as the input to the amplifier 314 can range between 50 mV when the sensing unit 108 is in an unpressed state and 325 mV when the sensing unit 108 is being pressed with a maximum amount of force within a normal force range for a user. The amplification of the amplifier 314 can be set to 8× in this example to amplify the signal 8 times. This will increase the resolution of the signal while ensuring that the voltage does not exceed a maximum allowable voltage value of 3V. In this example, amplifying the maximum voltage range value of 325 mV by 8× gives a maximum output value of the amplifier 314 of 2.6V, which is below the maximum allowable voltage value of 3V. In some implementations, the amplification provided by the amplifier 314 can only be multipliers that are powers of 2. In other implementations, other multiplier values for the amplification provided by amplifier 314 are possible. For example, continuing with the above example, a 9λ amplification could be applied because the result of amplifying the maximum differential voltage signal 312 of 325 mV value by 9× is 2.925V, which is still less than the maximum allowable voltage value of 3V.

In some implementations, a manufacturing test can be performed to determine an initial amplification level for the amplifier 314. For example, one or more robots can trigger one or more sensing units 108 of a computing device as part of a manufacturing process. The robots can apply varying amounts of pressure to the sensing units 108 and the output of the ADC 316 can be measured at the various different pressure levels. The amplification level of the amplifier 314 can be set during this testing process such that the output voltage of the amplifier 314 does fall outside of the acceptable voltage range for the ADC 316 when a high level of pressure is applied to the sensing unit 108 by the one or more robots. In some implementations, other parameters in addition to the amount of pressure applied to the sensing units 108 are varied to determine the correct amplification level for the amplifier 314. For example, temperature and ambient pressure in the environment of the computing device can be varied as part of the manufacturing test for determining an initial amplification level of the amplifier 314. In some implementations, amplifiers for each of the sensing units 108 of the computing device are individually calibrated. In some implementations, computing devices for which the output of the ADC 316 exceeds a threshold value for a particular amplification level of the amplifier 314 at a particular pressure (and/or temperature, ambient pressure) are discarded.

Continuing with the above example, the range of values of the differential voltage signal 312 that serves as the input to the amplifier 314 can change over time. For example, a user might drop a mobile device that includes the sensing unit 108 which can dent a portion of the sensing unit 108 and cause a baseline output voltage of the bridge circuit 302 to increase. For example, damage to the sensing unit 108 (such as a permanent dent) can cause the range of the differential voltage signal 312 to increase to 1.2V to 1.475V. The electronic circuit 122 can control the amplifier 314 to change the amplification level applied to the differential voltage signal 312 to account for this shift in the range of the differential voltage signal 312 output by the bridge circuit 302. In this example, the electronic circuit 122 can control the amplifier 314 to change the amplification to a 2× amplifier. This adjustment ensures that the signal received at the ADC 316 is still greater than the unamplified signal, while keeping the output voltage range of the amplifier 314 within the acceptable voltage range for the ADC 316. In this particular example, applying the 2× multiplier to the high end of the differential voltage signal 312 range (1.475V) leads to an output voltage of 2.95 from the amplifier 314, which is below the example maximum allowable voltage of 3V.

As another example, the range of values of the differential voltage signal 312 that serves as the input to the amplifier 314 can change in response to other factors (as discussed above) other than or in addition to damage to the mobile computing device. For example, fatigue of the sensing unit 108 due to continued use can cause the range of the differential voltage signal 312 to increase over time. For example, after two years of use, the range of the differential voltage signal 312 can increase to 700 mV to 975 mv. The electronic circuit 122 can control the amplifier 314 to change the amplification level applied to the differential voltage signal 312 to account for this shift in the range of the differential voltage signal 312 output by the bridge circuit 302. In this example, the electronic circuit 122 can control the amplifier 314 to change the amplification to a 3× amplifier. This adjustment ensures that the signal received at the ADC 316 is still greater than the unamplified signal, while keeping the output voltage range of the amplifier 314 within the acceptable voltage range for the ADC 316. In this particular example, applying the 2× multiplier to the high end of the differential voltage signal 312 range (975 mV) leads to an output voltage of 2.925 from the amplifier 314, which is below the example maximum allowable voltage of 3V. In some implementations, the amplifier 314 is restricted to amplification multipliers that are powers of 2. In such instances, in the above example in which the range of the differential voltage signal 312 increases to 700 mV to 975 mv, the electronic circuit 122 can adjust the amplifier 314 to apply a 2× multiplier to the differential voltage signal 312 to avoid railing of the signal received at the ADC 316.

In some implementations, the electronic circuit 122 adjusts the amplification level of the amplifier 314 periodically. In some implementations, the electronic circuit 122 adjusts the amplification of the amplifier 314 in response to a detected shift in a baseline output voltage of the bridge circuit 302 (or a detected shift in the baseline output voltage of the amplifier 314) that exceeds a predetermined threshold. In some implementations, the electronic circuit 122 adjusts the amplification level of the amplifier 314 in response to detected railing of the output signal of the amplifier 314. For example, if the electronic circuit 122 detects that the output of the ADC 316 is at or near a maximum count value (e.g., 10,000 counts, or above 995 counts in an example in which the output range of the ADC 316 is 1 to 10,000 counts) for a particular period of time, the electronic circuit 122 can determine that railing has occurred (i.e., that the output voltage of the amplifier 314 is outside of the allowable input voltage range for the ADC 316).

In some implementations, the electronic circuit 122 can perform an iterative process of continually stepping down the amplification level of the amplifier 314 until a particular amplification level that prevents railing is reached. In some implementations, the iterative process includes maintaining the amplifier 314 at a particular amplification level for a predetermined period of time to determine if railing occurs within the period of time at the particular amplification level.

In some implementations, the electronic circuit 122 can adjust the amplification level of the amplifier 314 in response to determining that an output value of the amplifier 314 (or an output value of the ADC 316) has not exceeded a threshold value for a specified period of time. For example, if the output of the ADC 316 ranges from 1 to 10,000 counts, the electronic circuit 122 can increase the amplification level of the amplifier 314 in response to determining that the output value of the ADC 316 has not exceeded 499 counts for a period of two days.

Continuing with FIG. 3, as discussed above, the bridge circuit 302 produces a baseline differential voltage signal 312 when the sensing unit 108 is in an unpressed state. This baseline differential voltage signal 312 is amplified by amplifier 314 and converted to a digital quantized value by the ADC 316 such that the ADC 316 produces a baseline output value. The baseline differential voltage signal 312 (and consequently the baseline output value of the ADC 316) can change over time due to factors such as damage to the sensing unit 108, wear and tear, changes in temperature, changes in atmospheric pressure, or degradation of components of the sensing unit 108 over time. The electronic circuit 122 can determine a baseline output value of the ADC 316 over a period of time and use this baseline value to detect occurrences of and the extent of user input. For example, the electronic circuit 122 can sample for inputs at the sensing unit 108 (i.e., pressure applied to the sensing unit 108) at a constant rate. The electronic circuit 122 can subtract the baseline output value of the ADC 316 from the output value of the ADC 316 for each sample to determine a differential between the output value for a particular sample and the baseline output value. This determined differential value can then be used to determine if a user has applied pressure to the sensing unit 108 and, in some cases, an extent or value of the pressure applied to the sensing unit 108.

The baseline output value of the ADC 316 can be determined using a number of techniques. As a first example, the electronic circuit 122 can average the sampled output values of the ADC 316 over a particular period of time to identify the baseline value. However, applying a simple average can lead to an incorrect baseline output value of the ADC 316 being identified as such an averaging technique would also include output values when the sensing unit 108 is being pressed.

Another example technique that can be used to determine a baseline output value of the ADC 316 includes filtering out samples over a given period of time that are indicative of a user pressing the sensing unit 108 and averaging the output values for the remaining samples. For example, the electronic circuit 122 can apply a low pass filter (LPF) to output values sampled over a period of ten minutes. The LPF can filter out sudden changes in the output value of the ADC 316 that are indicative of a user pressing the sensing unit 108. For example, output value increases that last for a period shorter than five seconds before returning to a substantially lower output value level can be filtered out. The remaining sampled output values are then averaged to determine the baseline output value of the ADC 316. Another example technique that can be implemented by the electronic circuit 122 to determine a baseline output value of the ADC 316 includes using a high-pass filter with a long period to track the baseline output value.

In some implementations, the process of determining/adjusting the identified baseline output value of the ADC 316 is performed periodically (e.g., every 10 minutes or every 2 hours). In some implementations, process of determining/adjusting the identified baseline output value of the ADC 316 is performed on a continual or rolling basis. For example, the electronic circuit 122 can continually identify a baseline output value for a rolling 10-minute window as each sample is measured. In other words, the baseline output value of the ADC 316 identified by the electronic circuit 122 continually represents the previous 10 minutes of recorded samples.

In some implementations, adjustment of the identified baseline output value of the ADC 316 is triggered by one or more parameters. For example, the electronic circuit 122 can identify that an output value of the bridge circuit 302 has sharply increased and remained increased for a threshold period of time (e.g., 30 seconds, 1 minute, 2 minutes, 5 minutes). Such a significant increase in the output value of the ADC 316 that does not significantly decrease after a threshold amount of time can indicate a permanent change in the baseline output value of the ADC 316 such as, for example, due to the mobile device that includes the sensing unit 108 being dropped and causing damage to the sensing unit 108 (e.g., a dent in a portion of the sensing unit 108). In response to determining that the output value of the ADC 316 has increased and remained at the increased level for a particular period of time, the electronic circuit 122 can adjust the identified baseline output value of the ADC 316. For example, the adjusted identified baseline output value of the ADC 316 can be an average of output values since the time at which the sharp increase occurred after a LPF has been applied to the samples recorded over that period of time. In some implementations, the electronic circuit 122 adjusts the identified baseline output value of the ADC 316 in response to an increase in the output values of the ADC 316 that exceeds a threshold value for a threshold period of time. For example, an increase in output values of the ADC 316 of 500 counts over that persists for two minutes can trigger the electronic circuit 122 to recalculate the baseline output value of the ADC 316.

As described above, the electronic circuit 122 can compare sampled output values of the ADC 316 to the calculated baseline output value of the ADC 316 to determine that a user has pressed the sensing unit 108 and, in some cases, the extent of the user input (e.g., whether the press is a soft press, medium press, hard press, etc.). For example, the electronic circuit 122 can subtract the calculated baseline output value of the ADC 316 from the output value of the ADC 316 for a particular sample. The difference between the output value for the sample and the baseline output value of the ADC 316 can then be categorized into a value range to determine if the sensing unit 108 is being pressed and the relative pressure being applied to the sensing unit 108. For example, the difference between the sensed output value and the baseline output value can be categorized into one of six discrete value ranges S0 to S5, with values falling into the S0 category indicating that the sensing unit 108 is not being pressed and values falling into categories S1-S5 indicating increasing amounts of pressure being applied to the sensing unit 108.

In some implementations, the electronic circuit 122 can adjust the amplification level of the amplifier 314 in response to detecting a change in the calculated baseline output value of the ADC 316 that exceeds a threshold value. For example, the electronic circuit 122 can adjust the amplification level of the amplifier 314 in response to the baseline output value of the ADC 316 increasing from 500 counts to 2,000 counts. As another example, an increase in the baseline output value of the ADC 316 of 1,000 counts can trigger the electronic circuit 122 to adjust the amplification level of the amplifier 314. As yet another example, a decrease in the baseline output value of the ADC 316 of 1,000 counts can trigger the electronic circuit 122 to adjust the amplification level of the amplifier 314.

In some implementations, the electronic circuit 122 can implement power management processes to conserve electrical power in response to one or more determined parameters. For example, the electronic circuit 122 can reduce a sampling rate for sampling output values of the ADC 316 in response to one or more determined parameters. The reduction in sampling rate conserves power for the computing device that includes the sensing unit 108.

In one example, the electronic circuit 122 can reduce the sampling rate for output values of the ADC 316 in response to determining that the computing device is in a sleep mode. For example, the electronic circuit 122 can use a sampling rate of 100 Hz when the computing device is in an active mode and reduce the sampling rate to 10 Hz (or 1 Hz or 1/10 Hz) when the device is in sleep mode. As another example, the electronic circuit 122 can reduce the sampling rate (e.g., to 10 Hz, 1 Hz, or 1/10 Hz) in response to a determination that the computing device is plugged into a power supply and is positioned on a horizontal surface (as determined by one or more gyroscopes and accelerometers of the computing device). Such a determination can indicate that a user is unlikely to interact with the sensing unit 108 and therefore that the sampling rate can be reduced. As another example, the electronic circuit 122 can reduce the sampling rate in response to outputs from a proximity detector. For example, if a proximity detector detects that the computing device is near an object, the electronic circuit 122 can reduce the sampling rate. As another example, the electronic circuit 122 can reduce the sampling rate in response to a combination of the proximity sensor detecting that the computing device is near an object and a touch screen (or other input) of the computing device not receiving user input for a specified period of time. Such a combination of parameters can indicate that the computing device is, for example, in the users pocket and therefore that the user in unlikely to interact with the sensing unit 108.

In some implementations, the electronic circuit 122 can increase the sampling rate in response to one or more determined parameters. For example, the electronic circuit 122 can increase the sampling rate from 1 Hz to 100 Hz in response to the computing device transitioning from a sleep mode to an active mode. As another example, the electronic circuit 122 can increase the sampling rate in response to the proximity sensor determining that the computing device is no longer near an object. As another example, the electronic circuit 122 can increase the sampling rate in response to one or more accelerometers of the computing device determining that the computing device has been moved from a horizontal position to a non-horizontal position, or has simply been moved in any direction more than a threshold amount. As another example, the electronic circuit 122 can increase the sampling rate in response to the computing device receiving a phone call or a notification such as an SMS message or a push notification from an application running on the computing device. The electronic circuit 122 can increase the sampling rate for a period of time in response to such an occurrence as the user is likely to want to respond to the received call or notification using the sensing unit 108.

In some implementations, the electronic circuit 122 can be configured to ignore fluctuations in the output values of the ADC 316 in response to one or more parameters. For example, if the proximity sensor of the computing device indicates that the computing device is near an object and the touch screen of the computing device is not receiving user input, this can indicate that the computing device is in a user's pocket. In response to such a determination, the electronic circuit 122 can ignore fluctuations in the output values of the ADC 316 that are below a particular threshold value as such fluctuations are likely due to walking or running motion of the user.

Figure 4:
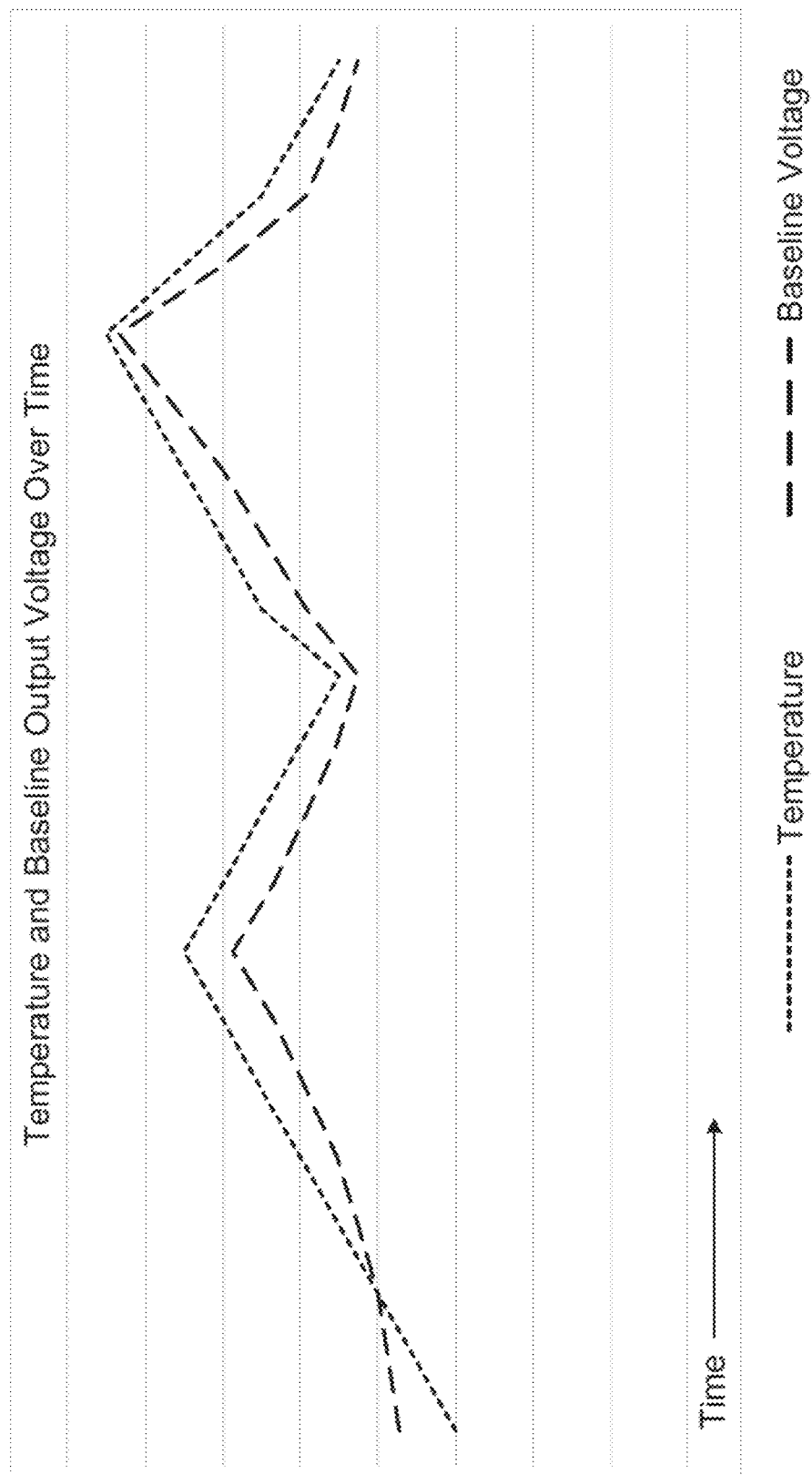
FIG. 4 illustrates a graph of changes to ambient temperature and baseline output voltage of a strain gauge over time.

FIG. 4 is a graph of changes to ambient temperature around a strain gauge over time and corresponding changes to baseline output voltage output by a sensing unit, such as the sensing unit 108. In the example shown, the baseline output voltages are, for example, voltages output by a resistor bridge of the sensing unit prior to amplification of the voltage signal or quantization of the voltage signal by an analog-to-digital converter (ADC). As shown in FIG. 4, the baseline voltage increases as ambient temperature increases and decreases as ambient temperature increases. In the system described with respect to FIGS. 1-3, the changes in baseline output voltage lead to corresponding changes in baseline output values of an ADC in electrical communication with the strain gauge.

As previously described, baseline output voltage is the differential output voltage of sensing unit when the sensing unit is in an unpressed state. Referring to both FIGS. 3 and 4, as the changes in baseline output voltage occur over time, the electronic circuit 122 can continually recalculate the baseline output value of the ADC 316 to adjust for the changes in baseline output voltage due to changes in temperature over time. As previously described, the electronic circuit 122 can apply an LPF or HPF to eliminate samples indicative of a user pressing the sensing unit 108 and average the remaining samples over a period of time (e.g., the last 10 minutes) to calculate the baseline output value of the ADC 316. As previously described, variations in other factors over time in addition to temperature can cause the baseline output voltage to change over time. For example, changes in atmospheric pressure, or degradation of a sensing unit 108 over time due to continued use can cause the baseline output voltage to change over time.

Figure 5:
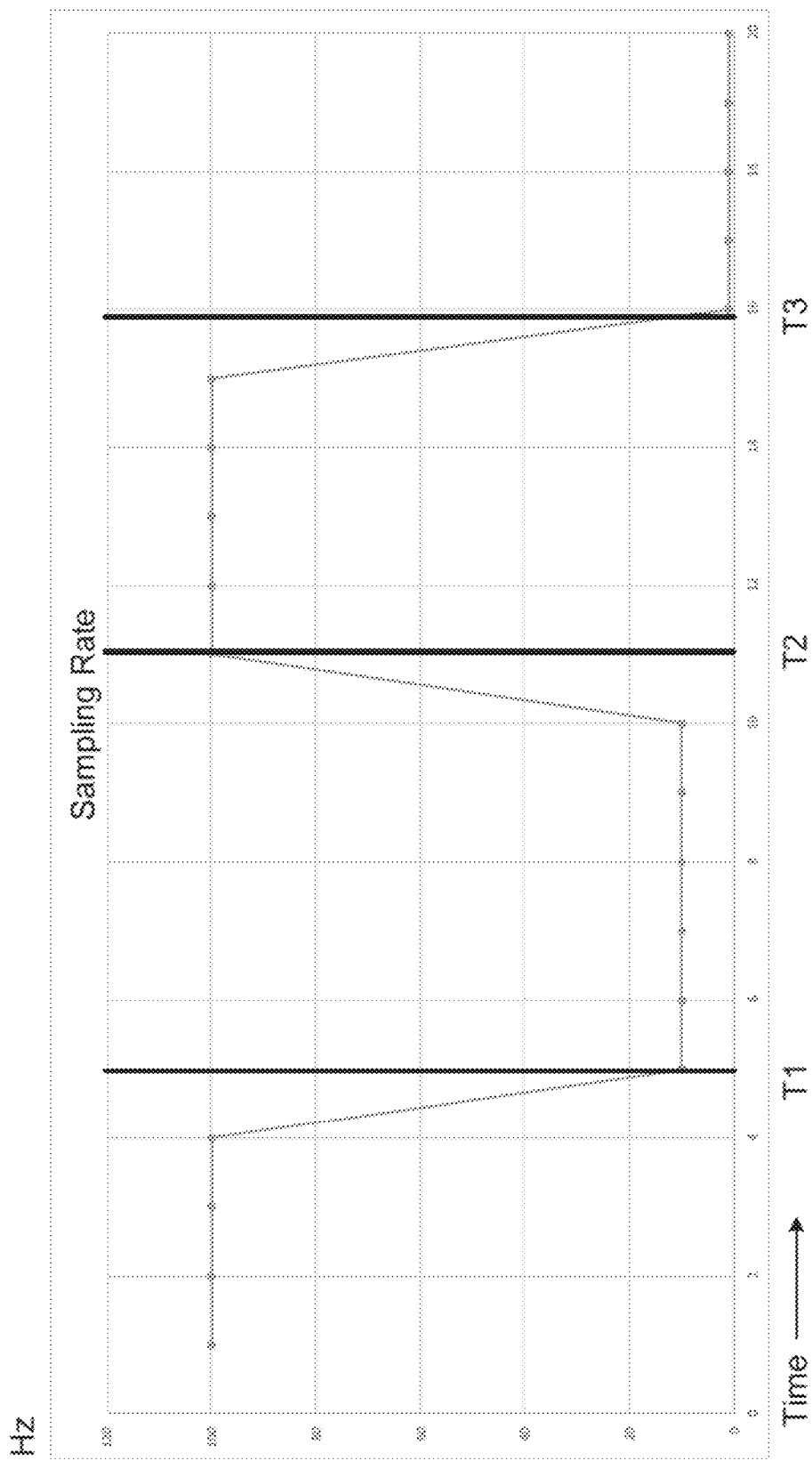
FIG. 5 illustrates a graph of changes to a sampling rate for a strain gauge over time.

FIG. 5 illustrates a graph of changes to a sampling rate for a strain gauge over time. As previously described, an electronic circuit of a strain gauge (such as the electronic circuit 122 of FIGS. 1 and 3) can adjust the sampling rate for sampling the output of an ADC in electrical communication with a strain gauge sensing unit (or, alternatively, the sampling rate for sampling the output of the sensing unit directly, or an amplifier in electrical communication with the sensing unit). The electronic circuit can adjust the sampling rate in response to one or more detected parameters.

For example, in FIG. 5, the initial sampling rate for an electronic circuit in communication with a strain gauge sensing unit is 100 Hz. This initial sampling rate can be a standard sampling rate when a computing device that includes the strain gauge is in an active mode. The electronic circuit maintains the sampling rate of 100 Hz until time T1. At time T1, the electronic circuit receives control signals indicating that a proximity sensor of the computing device detects a nearby object and that the touch screen of the computing device is not receiving touch input. This information can be interested by the electronic circuit to be indicative of the computing device being in a person's pocket. In response to this determination, the electronic circuit reduces the sampling rate to 10 Hz at time T1.

At time T2, the computing device returns to an active mode. For example, the user of the computing device can unlock the computing device or answer an incoming phone call. In response to the computing device returning to the active mode, the electronic circuit raises the sampling rate to the active mode sampling rate of 100 Hz. At time T3, the electronic circuit receives control signals indicating that the computing device is connected to a power source and is in a horizontal position. This information can indicate that the computing device is currently charging and resting on a table or other flat surface. In response to this received information, at time T3 the electronic circuit lowers the sampling rate to 1 Hz.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus.

Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A number of embodiments have been described. Nevertheless, it will be understood that various modifications may be made without departing from the spirit and scope of the disclosed technology. For example, various forms of the flows shown above may be used, with steps re-ordered, added, or removed. Also, although several applications of the strain gauge sensing unit system and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An apparatus for sensing user input provided on an exterior surface of a device, comprising:
    a first strain gauge configured to couple with a housing of an electronic device;
    an amplifier electrically coupled to the first strain gauge and configured to generate a plurality of analog signals by amplifying an electrical property of the first strain gauge;
    an analog-to-digital converter electrically coupled to the amplifier and configured to receive the plurality of analog signals from the amplifier and generate a plurality of digital signals that are representations of the plurality of analog signals generated by the amplifier;
    a motion detecting sensor to detect motion of the electronic device, the motion detecting sensor being distinct from the first strain gauge; and
    an electronic circuit electrically coupled to the analog-to-digital converter and configured to:
        (i) receive digital signals from the analog-to-digital converter,
        (ii) receive signals indicative of motion information detected by the motion detecting sensor,
        (iii) determine, at least in part based on the signals indicative of motion information detected by the motion detecting sensor, to implement a power management process to reduce power consumption by reducing a sampling rate at which the electronic circuit samples digital signals output by the analog-to-digital converter, and
        (iv) implement the power management process to reduce power consumption by reducing the sampling rate at which the electronic circuit samples digital signals output by the analog-to-digital converter from a first sampling rate to a second sampling rate, the second sampling rate being lower than the first sampling rate.

2. The apparatus of claim 1, wherein the motion detecting sensor of the electronic device comprises an accelerometer.

3. The apparatus of claim 1, wherein the motion detecting sensor of the electronic device comprises an accelerometer.

4. The apparatus of claim 1, wherein the electronic circuit is further configured to change the sampling rate from a third sampling rate to a fourth sampling rate in response to a proximity detector of the electronic device detecting an object within a threshold distance of the electronic device, wherein the fourth sampling rate is distinct from the third sampling rate.

5. The apparatus of claim 1, wherein the electronic circuit is further configured to change the sampling rate from a third sampling rate to a fourth sampling rate in response to (1) determining that the electronic device is within a threshold distance of an object, based on signals generated by a proximity detector of the electronic device; and (2) an input mechanism of the computing device not having received user input for a specified period of time, wherein the fourth sampling rate is distinct from the third sampling rate.

6. The apparatus of claim 1, wherein the electronic circuit is configured to reduce the sampling rate from the first sampling rate to the second sampling rate in response to determining that the electronic device has moved in a particular direction more than a threshold amount.

7. The apparatus of claim 1, wherein the electronic circuit is configured to change the sampling rate from a third sampling rate to a fourth sampling rate in response to determining that the electronic device has entered a sleep mode, wherein the fourth sampling rate is distinct from the third sampling rate.

8. The apparatus of claim 1, wherein the electronic circuit is configured to change the sampling rate from a third sampling rate to a fourth sampling rate in response to determining that the electronic device is in an inactive mode, wherein the fourth sampling rate is distinct from the third sampling rate.

9. The apparatus of claim 1, wherein the first sampling rate is approximately 100 Hz and the second sampling rate is approximately 10 Hz.

10. The apparatus of claim 1, wherein the electronic circuit is configured to change the sampling rate from a third sampling rate to a fourth sampling rate in response to determining that the electronic device is attached to a docking station, wherein the fourth sampling rate is distinct from the third sampling rate.

11. The apparatus of claim 1, wherein the electronic circuit is configured to reduce the sampling rate from the first sampling rate to the second sampling rate in response to determining that the electronic device is connected to a power source and is positioned in a relatively horizontal position.

12. A method of controlling an electronic circuit of an electronic device, wherein the electronic circuit is in operative communication with a first strain gauge coupled to the housing of the electronic device, the method comprising:
    sampling, at a first sampling rate by the electronic circuit, digital signals generated by an analog-to-digital converter in response to user input that interacts with the housing of the electronic device, the analog-to-digital converter configured to receive a plurality of analog signals generated by an amplifier in operative communication with the first strain gauge of the electronic device, the analog-to-digital converter further configured to generate a plurality of digital signals that are representations of the collections of analog signals generated by the amplifier;
    receiving signals from at least one motion sensor of the electronic device, the at least one motion sensor being distinct from the first strain gauge;
    identifying, by the electronic circuit and using the signals received from the at least one motion sensor, a trigger event; and
    in response to identifying the trigger event, sampling, at a second sampling rate by the electronic circuit, digital signals generated by the analog-to-digital converter, the second sampling rate being different from the first sampling rate.

13. The method of claim 12, wherein the at least one motion sensory comprises one or more accelerometers of the electronic device.

14. The method of claim 12, wherein the at least one motion sensory comprises one or more gyroscopes of the electronic device.

15. The method of claim 12 further comprising, changing a sampling rate at which the electronic circuit samples digital signals generated by the analog-to-digital converter from a third sampling rate to a fourth sampling rate in response to detection of an object within a threshold distance of the electronic device by one or more proximity detectors of the electronic device, wherein the fourth sampling rate is distinct from the third sampling rate.

16. The method of claim 15, further comprising:
    determining that the one or more proximity detectors no longer detect an object within the threshold distance of the electronic device; and
    in response to determining that the one or more proximity detectors no longer detect an object within the threshold distance of the electronic device, sampling, at the third sampling rate by the electronic circuit, the digital signals generated by the analog-to-digital converter.

17. The method of claim 12 further comprising, changing a sampling rate at which the electronic circuit samples digital signals generated by the analog-to-digital converter from a third sampling rate to a fourth sampling rate in response to the electronic device entering a sleep mode, wherein the fourth sampling rate is distinct from the third sampling rate.

18. The method of claim 12 further comprising, changing a sampling rate at which the electronic circuit samples digital signals generated by the analog-to-digital converter from a third sampling rate to a fourth sampling rate in response to the electronic device exiting a sleep mode, wherein the fourth sampling rate is distinct from the third sampling rate.

19. The method of claim 12 further comprising, changing a sampling rate at which the electronic circuit samples digital signals generated by the analog-to-digital converter from a third sampling rate to a fourth sampling rate in response to the electronic device transitioning from a relatively horizontal position to a relatively non-horizontal position, wherein the fourth sampling rate is distinct from the third sampling rate.

20. The method of claim 12 further comprising, changing a sampling rate at which the electronic circuit samples digital signals generated by the analog-to-digital converter from a third sampling rate to a fourth sampling rate in response to the electronic device receiving an incoming phone call or text message, wherein the fourth sampling rate is distinct from the third sampling rate.

21. The method of claim 12, wherein identifying the trigger event is performed based on a determination as to if the electronic device is connected to a power source.

22. An apparatus for sensing user input provided on an exterior surface of an electronic device, comprising:
    a first strain gauge configured to couple with a housing of the electronic device;
    an amplifier electrically coupled to the first strain gauge and configured to generate a plurality of analog signals by amplifying an electrical property of the first strain gauge;
    an analog-to-digital converter electrically coupled to the amplifier and configured to receive the plurality of analog signals from the amplifier and generate a plurality of digital signals that are representations of the plurality of analog signals generated by the amplifier;
    a motion detecting sensor to detect motion of the electronic device, the motion detecting sensor being distinct from the first strain gauge; and
    an electronic circuit electrically coupled to the analog-to-digital converter and configured to:
        (i) receive digital signals from the analog-to-digital converter,
        (ii) receive signals indicative of motion information detected by the motion detecting sensor,
        (iii) detect, at least in part based on the signals indicative of motion information detected by the motion detecting sensor, motion of the electronic device, and (iv) increase a sampling rate at which the electronic circuit samples digital signals output by the analog-to-digital converter from a first sampling rate to a second sampling rate at least in part in response to the detected motion of the electronic device, the second sampling rate being higher than the first sampling rate.

23. The apparatus of claim 22, wherein the electronic circuit is further configured to change the sampling rate at which the electronic circuit samples digital signals generated by the analog-to-digital converter from a third sampling rate to a fourth sampling rate in response to the electronic device exiting a sleep mode, wherein the fourth sampling rate is distinct from the third sampling rate.

24. The apparatus of claim 22, wherein the electronic circuit is further configured to change the sampling rate at which the electronic circuit samples digital signals generated by the analog-to-digital converter from a third sampling rate to a fourth sampling rate in response to the electronic device receiving an incoming phone call or text message, wherein the fourth sampling rate is distinct from the third sampling rate.

25. The apparatus of claim 22, wherein the motion detecting sensor of the electronic device comprises an accelerometer.

26. The apparatus of claim 22, wherein the motion detecting sensor of the electronic device comprises a gyroscope.

27. The apparatus of claim 22, wherein the electronic circuit is further configured to change the sampling rate at which the electronic circuit samples digital signals generated by the analog-to-digital converter from a third sampling rate to a fourth sampling rate in based on one or more signals generated by one or more proximity detectors of the electronic device, wherein the fourth sampling rate is distinct from the third sampling rate.

* * * * *